United States Patent

Stibbs

[15] 3,649,312

[45] Mar. 14, 1972

[54] TRANSITION METAL BORIDE COMPOSITIONS

[72] Inventor: Donald Stibbs, Dorking, Surrey, England

[73] Assignee: United States Borax & Chemical Corporation, Los Angeles, Calif.

[22] Filed: Dec. 17, 1969

[21] Appl. No.: 885,959

[30] Foreign Application Priority Data

Dec. 20, 1968   Great Britain ...................... 60,780/68

[52] U.S. Cl. .................................................106/55, 106/57
[51] Int. Cl. ..............................................................C04b 35/58
[58] Field of Search ........................106/55, 57, 43; 252/520

[56] References Cited

UNITED STATES PATENTS

| | | | |
|---|---|---|---|
| 2,735,155 | 2/1956 | Glaser | 106/55 |
| 2,814,566 | 11/1957 | Glaser | 106/43 |
| 2,872,327 | 2/1959 | Taylor | 106/55 |

*Primary Examiner*—James E. Poer
*Attorney*—James R. Thornton

[57] ABSTRACT

Boron nitride in an amount of at least 0.5 percent by weight is added to transition metal borides containing a small amount of elemental boron. When the mixture is compacted by heat and pressure, a hard sintered body having a high resistance to cracking is obtained.

8 Claims, No Drawings

TRANSITION METAL BORIDE COMPOSITIONS

This invention relates to a composition containing a boride of a transition metal which can be used for making a body of high resistance to cracking when immersed in molten metals, and to such a body and a process for producing such bodies.

In British Specification No. 1,010,492 is described a mixture comprising titanium diboride together with finely divided elemental boron, which mixture can be compacted by heat and pressure to provide a titanium diboride body which is highly resistant to cracking on immersion in molten metals. I have now found that titanium diboride bodies of exceptionally high strength can be prepared from a composition which contains, in addition to titanium diboride and the elemental boron anticracking agent, at least 0.5 percent by weight of boron nitride. Borides of transition metals other than titanium, such as zirconium diboride, and mixtures thereof, can also be shaped to provide hard refractory bodies when in a composition which includes elemental boron as an anticracking agent and at least 0.5 percent boron nitride.

Thus, the present invention provides a refractory composition which consists of a boride of a transition metal, finely divided elemental boron in an amount preferably not exceeding 3 percent and at least 0.5 percent and up to 5 percent of boron nitride. The invention provides also a process for producing a refractory body having high resistance to penetration by molten metal which comprises intimately mixing a finely divided transition metal boride, preferably titanium diboride, with finely divided elemental boron as an anticracking agent and with at least 0.5 percent boron nitride, and compacting the mixture by means of heat and pressure. The invention further provides a refractory body comprising a compacted mixture of a transition metal boride, elemental boron, and at least 0.5 percent boron nitride.

In a composition of the invention, and in the mixtures used in the process of the invention the quantity of elemental boron is preferably in the range 0.25–1 percent while the quantity of boron nitride is preferably up to about 2.5 percent, the balance being generally entirely the transition metal boride.

In a typical example of the invention there was formed a mixture having the following components by weight:

titanium diboride 96.5 percent
elemental boron 1 percent
boron nitride 2.5 percent Each of these components had particle sizes in the range 3 to 5 microns. The mixture was mixed in a ball mill for 14 hours and then hot-pressed at a temperature of about 1,850° C. under a pressure of 1 ton per square inch to form bars about 18 inches long and 3 inches square. These bars were found to have exceptional resistance to penetration by molten aluminum when immersed therein, (penetration being a major cause of cracking) and also to have high impact resistance, giving high mechanical strength.

Similar results are obtained with compositions based on zirconium diboride and mixtures of zirconium and titanium diborides.

Various changes and modifications of the invention can be made and, to the extent that such variations incorporate the spirit of this invention, they are intended to be included within the scope of the appended claims.

What is claimed is:

1. A composition comprising, by weight, about 0.25 to 3 percent boron, about 0.5 to 5 percent boron nitride, and the balance transition metal boride.

2. A composition according to claim 1 in which said transition metal boride is selected from the group consisting of titanium diboride, zirconium diboride, and mixtures thereof.

3. A composition according to claim 1 in which 0.25 to 1 percent boron is present.

4. A composition according to claim 1 in which 0.5 to 2.5 percent boron nitride is present.

5. A hot-pressed sintered composition according to claim 1.

6. A composition according to claim 1 having the components, by weight 96.5 percent titanium diboride
1 percent elemental boron
2.5 percent boron nitride 7. A hard sintered composition comprising, by weight, 0.25 to 1 percent boron, 0.5 to 2.5 percent boron nitride, and the balance transition metal boride.

8. A composition according to claim 7 in which said transition metal boride is titanium diboride.

* * * * *